United States Patent [19]
Kataoka

[11] Patent Number: 5,777,612
[45] Date of Patent: Jul. 7, 1998

[54] MULTIMEDIA DYNAMIC SYNCHRONIZATION SYSTEM

[75] Inventor: Hiroshi Kataoka, Kawasaki, Japan

[73] Assignee: Fujitsu Limited, Kawasaki, Japan

[21] Appl. No.: 562,179

[22] Filed: Nov. 22, 1995

[30] Foreign Application Priority Data

Mar. 20, 1995 [JP] Japan .................................. 7-059597

[51] Int. Cl.$^6$ .................................................. G06T 13/00
[52] U.S. Cl. .................................................. 345/302
[58] Field of Search .................................. 395/806, 807, 395/327; 345/302, 326, 327, 328

[56] References Cited

U.S. PATENT DOCUMENTS 5,515,490  5/1996  Buchanan et al. ................... 395/154
5,537,528  7/1996  Takahashi et al. ................... 395/154

FOREIGN PATENT DOCUMENTS 3-294936  12/1991  Japan .
6-208361  7/1994  Japan .

OTHER PUBLICATIONS

Blakowski et al. "Tools for Specifying and Executing Synchronized Multimedia Presentations", 1991.

*Primary Examiner*—Almis R. Jankus
*Attorney, Agent, or Firm*—Staas & Halsey

[57] ABSTRACT

A multimedia dynamic synchronization system which flexibly adapts to a change of conditions for synchronization of multimedia elements with each other according to the passage of time. The system stores the multimedia data in classified media management means, and synchronization control data in a control table for synchronizing the media elements with each other. The control table stores the synchronization control data in a form of intermediate synchronization control parameters, which are preparatory values to calculate final variables. While the multimedia presentation is performed, data transition calculation means calculates the synchronization control data for final use based on the intermediate synchronization control parameters. Since the system calculates final synchronization control data each time it performs presentation, the system would not be so much affected by any modification of the control table.

4 Claims, 11 Drawing Sheets

| FRAME NUMBER | 1 | 2 | 3 | 4 | 5 | 6 |
|---|---|---|---|---|---|---|
| SEQUENCE DATA MEMORY FOR TIMING | 10 0 | - 1 | 20 0 | - 1 | - 2 | - 3 |
| SEQUENCE DATA MEMORY FOR OBJECT #1 | TEXT 0 | 1 | 2 | 3 | | |
| SEQUENCE DATA MEMORY FOR OBJECT #2 | | VIDEO 0 | 1 | 2 | 3 | 4 |
| SEQUENCE DATA MEMORY FOR OBJECT #3 | | | | SOUND 0 | 1 | 2 |

| FRAME NUMBER | 1 | 2 | 3 | 4 | 5 | 6 |
|---|---|---|---|---|---|---|
| SEQUENCE DATA MEMORY FOR TIMING | 10 0 | -1 | <u>10</u> 0 | -1 | -2 | -3 |
| SEQUENCE DATA MEMORY FOR OBJECT #1 | TEXT 0 | 1 | 2 | 3 | | |
| SEQUENCE DATA MEMORY FOR OBJECT #2 | | VIDEO 0 | 1 | 2 | 3 | 4 |
| SEQUENCE DATA MEMORY FOR OBJECT #3 | | | | SOUND 0 | 1 | 2 |

PRIOR ART

| | 1 | 2 | 3 | 4 | 5 | 6 |
|---|---|---|---|---|---|---|
| FRAME NUMBER | 1 | 2 | 3 | 4 | 5 | 6 |
| TIME | 0 | 10 | 20 | 50 | 70 | 90 |
| TEXT | DISPLAY | DISPLAY | DISPLAY | DISPLAY | | |
| VIDEO | | DISPLAY | DISPLAY | DISPLAY | DISPLAY | DISPLAY |
| SOUND | | | | REPLAY | REPLAY | REPLAY |

FIG. 11

MULTIMEDIA DYNAMIC SYNCHRONIZATION SYSTEM

BACKGROUND OF THE INVENTION

1. Field of the Invention

The present invention relates to a multimedia dynamic synchronization system, and more specifically, to a multimedia dynamic synchronization system which offers easy manipulation for synchronization of multimedia data along the passage of time at a production stage of multimedia titles.

2. Description of the Related Art

Multimedia systems deal with various types of multimedia data such as text, graphics image, video, sound, and vector data. In order to represent, in such systems, a plurality of multimedia data objects simultaneously in a single frame, all those objects should follow to the transition of time, location, or frame numbers, being synchronized with each other. While video and sound are time-based objects that change as time elapses, text display depends on the frame number and vector data may change its appearance depending on display location. That is, concurrent presentation of a plurality of those multimedia data requests synchronized output of the data having such different natures.

Figure 11:
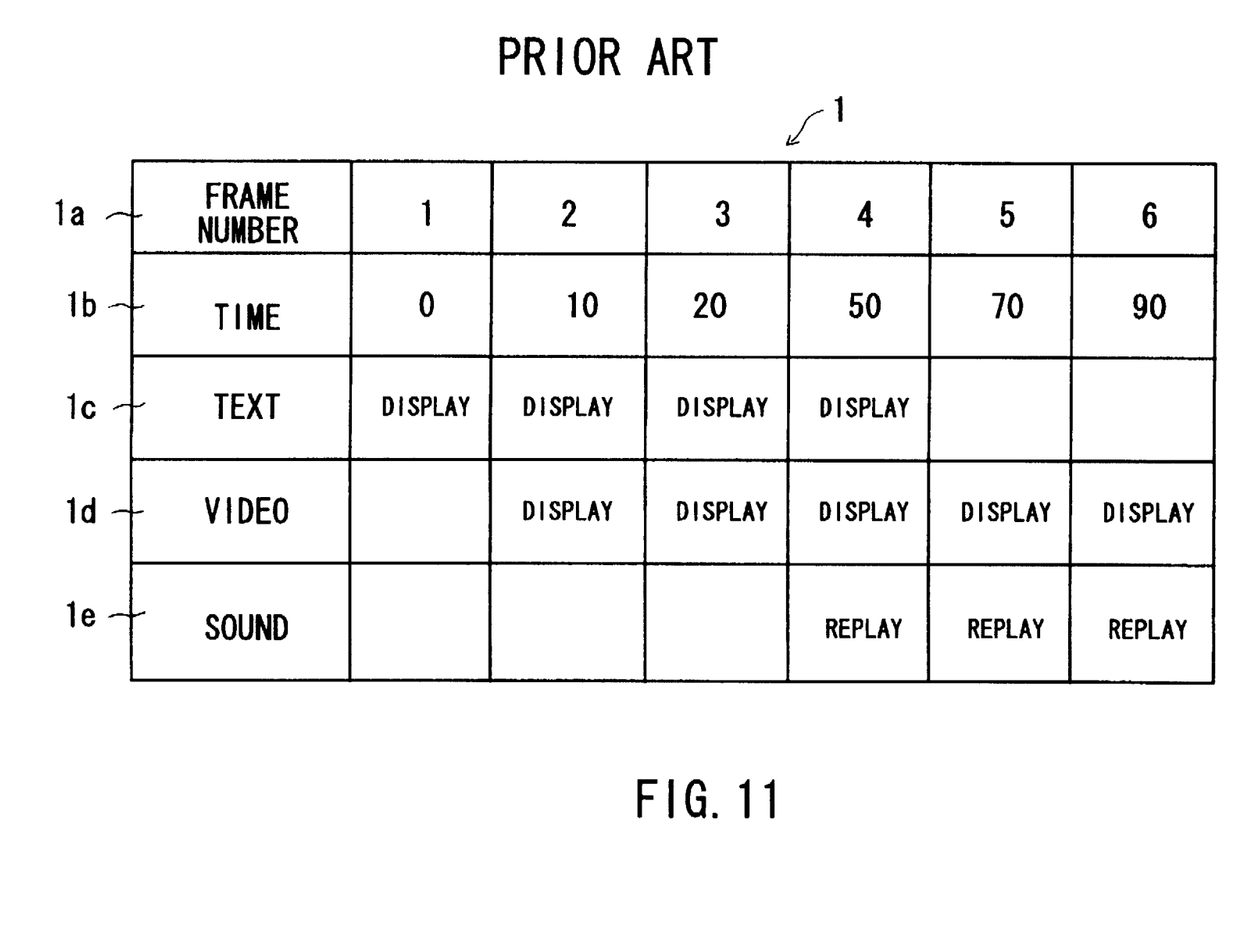
FIG. 11 exemplifies a table used for a conventional synchronization control method.

FIG. 11 exemplifies a table used for a conventional synchronization control method.

A table 1 for controlling a conventional synchronization control method for multimedia data contains rows which are assigned for frame number 1a and time 1b to define a sequential order of frames to display multimedia data objects and starting time of each frame, respectively. This table 1 further contains rows assigned for the multimedia data objects such as text 1c, video 1d and sound 1e.

The table 1 indicates that frame #1 (i.e., the frame numbered as "1") begins at the time "0" wherein the first page of the text is displayed. Assuming that the time unit is one second in this case, frame #2 comes 10 seconds after the beginning and the video starts concurrently with a change of the text to page 2. In frame #3 at the time "20," the video proceeds to the next data along with the text that changed to page 3. In frame #4 at the time "50," the text changes to page 4, the next video appears, and concurrently, the sound starts replay. In frame #5 at the time "70," the further video and sound are replayed while there is no more text to be displayed.

As such, the table 1 stores information concerning various types of multimedia data, which describes whether each of the data is to be output or not in reference with the passage of time or the transition of the frame numbers.

In the conventional synchronization control method for multimedia data, however, the timing of data synchronization is restricted to the start timing of the data and there is no way to selectively output a middle portion of the data, since the table 1 only contains simple information concerning whether the data is to be output or not.

To solve the above problem, there is provided another multimedia data synchronization method which previously calculates synchronization control data such as time, position, and frame number and stores the results classified by the types of object. This method can produce a fully synchronized presentation of multimedia data only by controlling it with the previously stored synchronization control data.

However, the latter method which calculates all the synchronization control data in advance has a drawback that, when it becomes necessary to change the synchronization conditions in the middle of presentation, it must recalculate and alter the remaining synchronization control data for all the objects that have been activated at the moment of the change.

SUMMARY OF THE INVENTION

Taking the above into consideration, an object of the present invention is to provide a multimedia dynamic synchronization system, which offers flexibility of synchronization to deal with dynamically changing factors such as time, location and frame, and also provides adaptiveness to modification of the synchronization conditions.

To accomplish the above object, according to the present invention, there is provided a multimedia dynamic synchronization system which simultaneously represents a plurality of multimedia data objects in synchronization with transitions of time, location and frame number. This system comprises classified media management means for storing a plurality of data specific to respective types of media being classified by the types of the media. The system also comprises a control table for storing common information which is common to all of the media involved in said classified media management means, and data transition calculation means which calculates synchronization control data for the media in reference to the common information each time a presentation of the media is performed.

The above and other objects, features and advantages of the present invention will become apparent from the following description when taken in conjunction with the accompanying drawings which illustrate a preferred embodiment of the present invention by way of example.

DESCRIPTION OF THE PREFERRED EMBODIMENT

An embodiment of the present invention will be described below with reference to the drawings.

Figure 1:
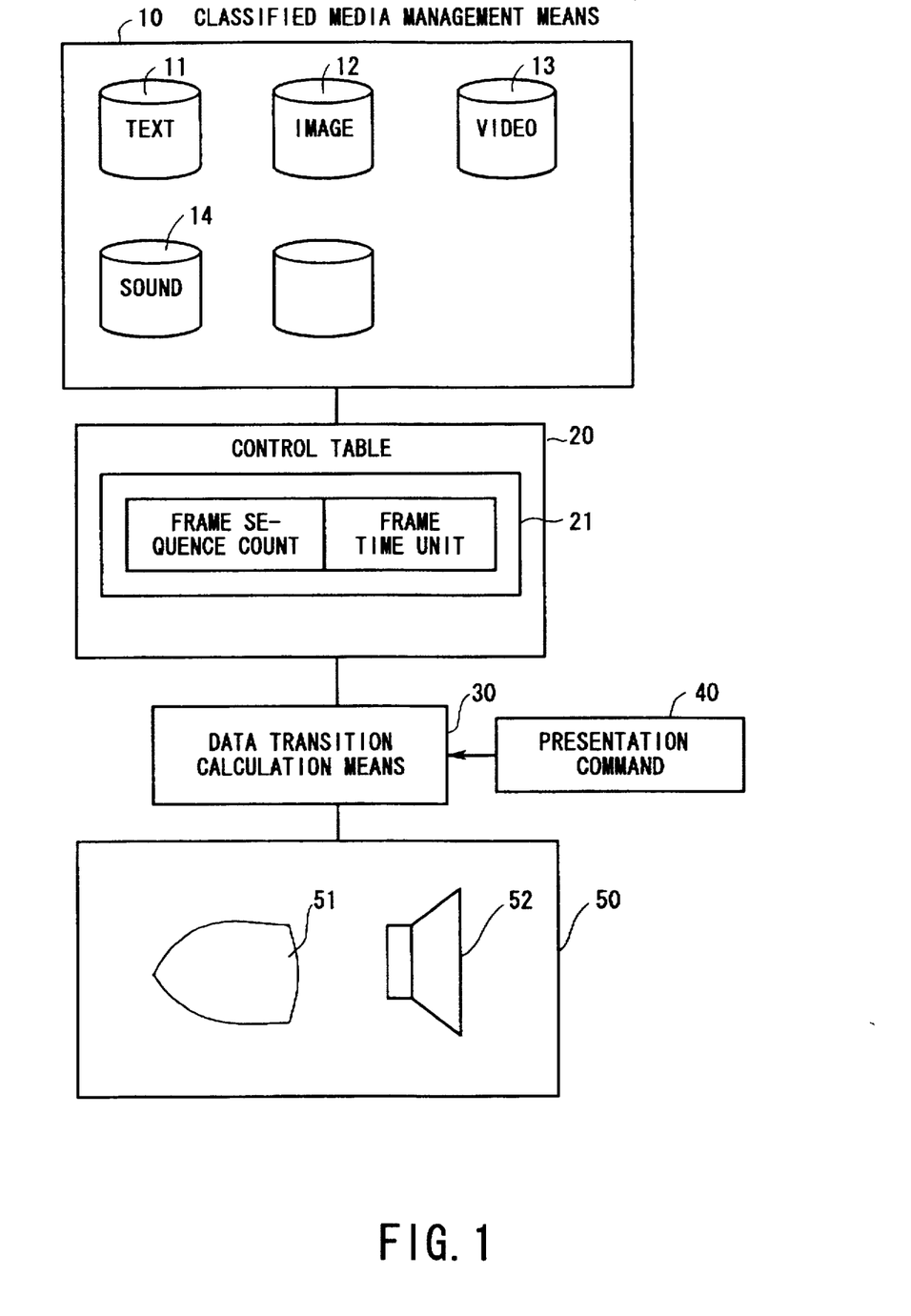
FIG. 1 is a conceptual view of a multimedia dynamic synchronization system according to the present invention.

FIG. 1 is a conceptual view of a multimedia dynamic synchronization system according to the present invention.

The system shown in FIG. 1 comprises classified media management means 10 which manages data specific to respective media, and control table 20 which stores information common to all the media. The classified media management means 10 stores multimedia data classified by the types of media. For example, text is filed in a text management block 11, graphics image is in an image management block 12, video is in a video management block 13, sound is in a sound management block 14 and so on. The control table 20, which stores information common to the media whose data are filed in the classified media management means 10, comprises sequence data storage means 21. This sequence data storage means 21 stores intermediate synchronization control parameters required for calculation of a synchronization control data. The intermediate synchronization control parameters are the data for synchronization which remains broken down into two kinds of primitive parameters, "frame sequence count" and "frame unit time." Frame sequence count is a number counted up every frame to show how long the media data continues from the beginning thereof. Frame unit time, on the other hand, shows the unit time length per frame during which the media data is continuously output.

The system also comprises data transition calculation means 30 which calculates the synchronization control data. This data transition calculation means 30, upon reception of a presentation command 40, refers to the control table 20 and calculates the synchronization control data for final use in respective media based on the intermediate synchronization control parameters obtained from the control table 20. The synchronization control data thus calculated by the data transition calculation means 30 are then output to a presentation means 50.

The classified media management means 10 and the control table 20 in this system are created at a production stage of multimedia titles, while the data transition calculation means 30 is a means used to replay the titles.

In such a structural arrangement, when the presentation command 40 is issued to the data transition calculation means 30, the data transition calculation means 30 consults the control table 20 and calculates the synchronization control data for the requested media using the intermediate synchronization control parameters stored in the control table 20, which calculation of the synchronization control data is repeated as many times as the number of media elements to be output.

The synchronization control data thereby calculated is used in the presentation means 50 to display the text, video and the like with display means 51 and to replay the sound with audio output means 52, and this will make it possible to show all those multimedia data objects being dynamically synchronized with each other according to the passage of time and the transition of location and frame number.

Figure 2:
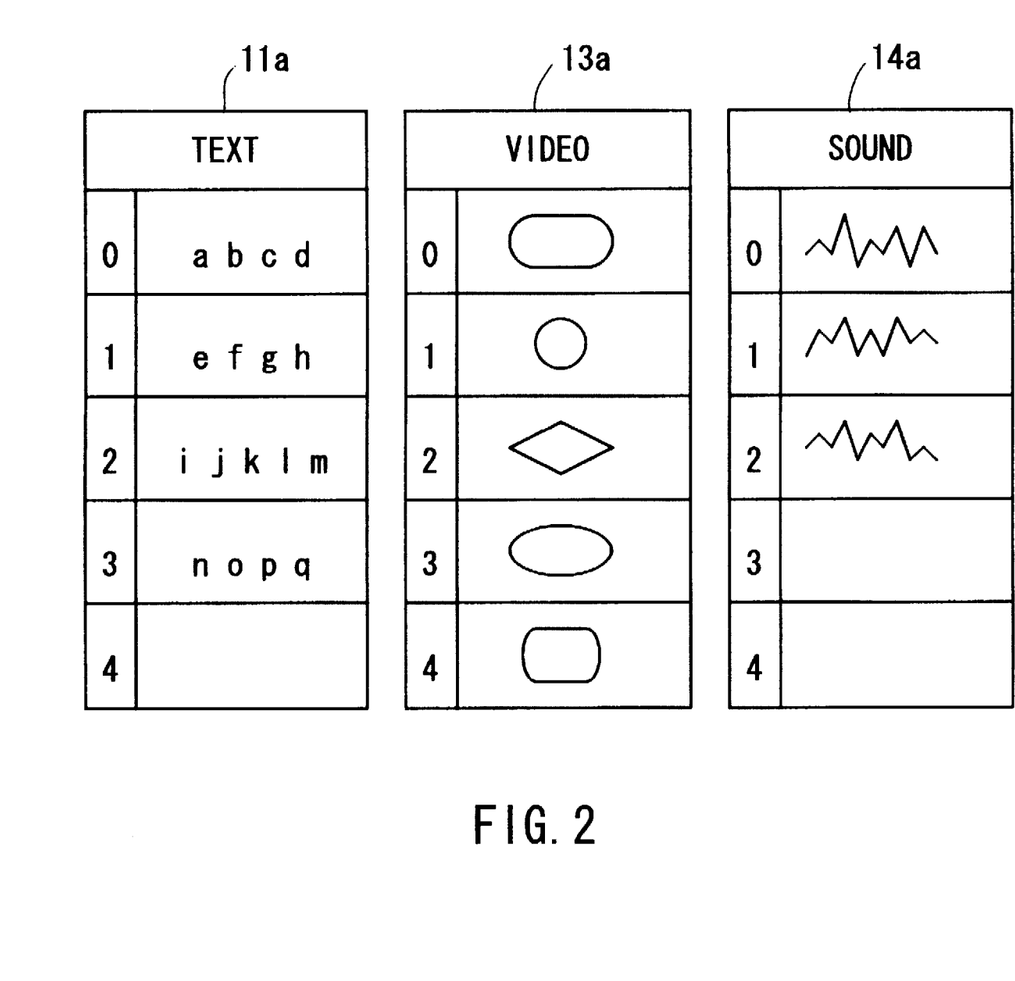
FIG. 2 shows some examples of media elements stored in classified media management means.

FIG. 2 shows some examples of media elements stored in classified media management means.

The examples are text 11a stored in a text management block 11, video 13a in a video management block 13, and sound 14a in a sound management block 14. Every frame data of those media elements is given a sequential number starting with zero for the first frame. The way of numbering in FIG. 2, however, are only for making the following explanation simple, while the numbers are actually provided so that they will correspond with information such as frame transitions or time passage.

Figure 3:
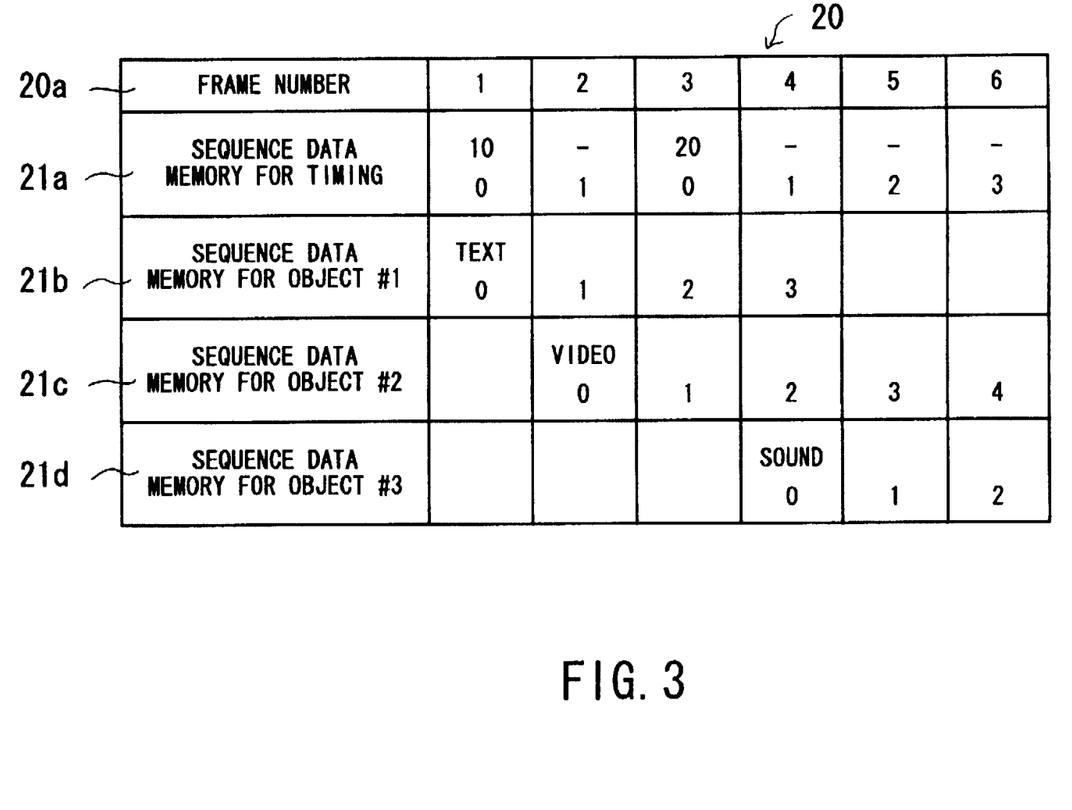
FIG. 3 illustrates contents of a control table.

FIG. 3 illustrates contents of a control table.

The control table 20 contains a row for frame numbers 20a and several rows for sequence data memories. The sequence data memories include a sequence data memory for timing 21a and those dedicated to the respective objects such as sequence data memories for object #1 21b, object #2 21c and object #3 21d. In the shown example, the text 11a, video 13a and sound 14a are assigned to objects #1, #2 and #3, respectively.

Looking into the details of the sequence data memory for timing 21a in this control table 20, the frame unit time "10" is specified in the frames #1 and #2, whose frame sequence counts are "0" and "1", respectively. The frame unit time defined for frames #3 and later is "20" and the frame sequence counts assigned thereto are as "0," "1," "2," and so on. The frame unit time can take any unit of time (i.e., second, millisecond etc.). A symbol "-" shown in the control table inidicates a frame unit time whose value is equal to that in the previous frame. The frame sequence counts corresponds to the sequential numbers starting from zero which are given to each media data.

Regarding the text, their frame sequence counts are defined for frames #1 to #4, which definition implies that different text will be displayed in each frame while the duration of each display is 10 time-units in frames #1 and #2 or 20 time-units in frames #3 and #4.

As for the video data, the sequence data memory for object #2 21c shows that it will be replayed for 10 time-units in frame #2, and for 20 time-units in every frame after that. In a similar way, the sound data will start at frame #4 and be replayed from the first at the rate of 20 time-units per frame.

As described above, the control table defines presentation timing of objects associated with the frame number, which teaches from what point of the media data the presentation should start. This timing information is what is called synchronization control data, or a synchronization control variable (to be called as "sync-control variable," hereafter), and it is obtained by calculating the product of the frame unit time and the frame sequence count. For example, when the frame sequence count is "6" (i.e., six frames) and the frame unit time is 10 ms per frame, the presentation of the object begins from the seventh frame whose starting time is 60 ms, for 6×10 =60.

The frame unit time and frame sequence count specified in the sequence data memory for timing 21a may change while the sequence proceeds from the frame sequence count #0 to #n, where #n is the count in a certain frame. The sync-control variable in such a case is obtained in the data transition calculation means 30 as a sum of products of the frame unit time and the frame sequence count in a plurality of synchronization conditions.

Figure 4:
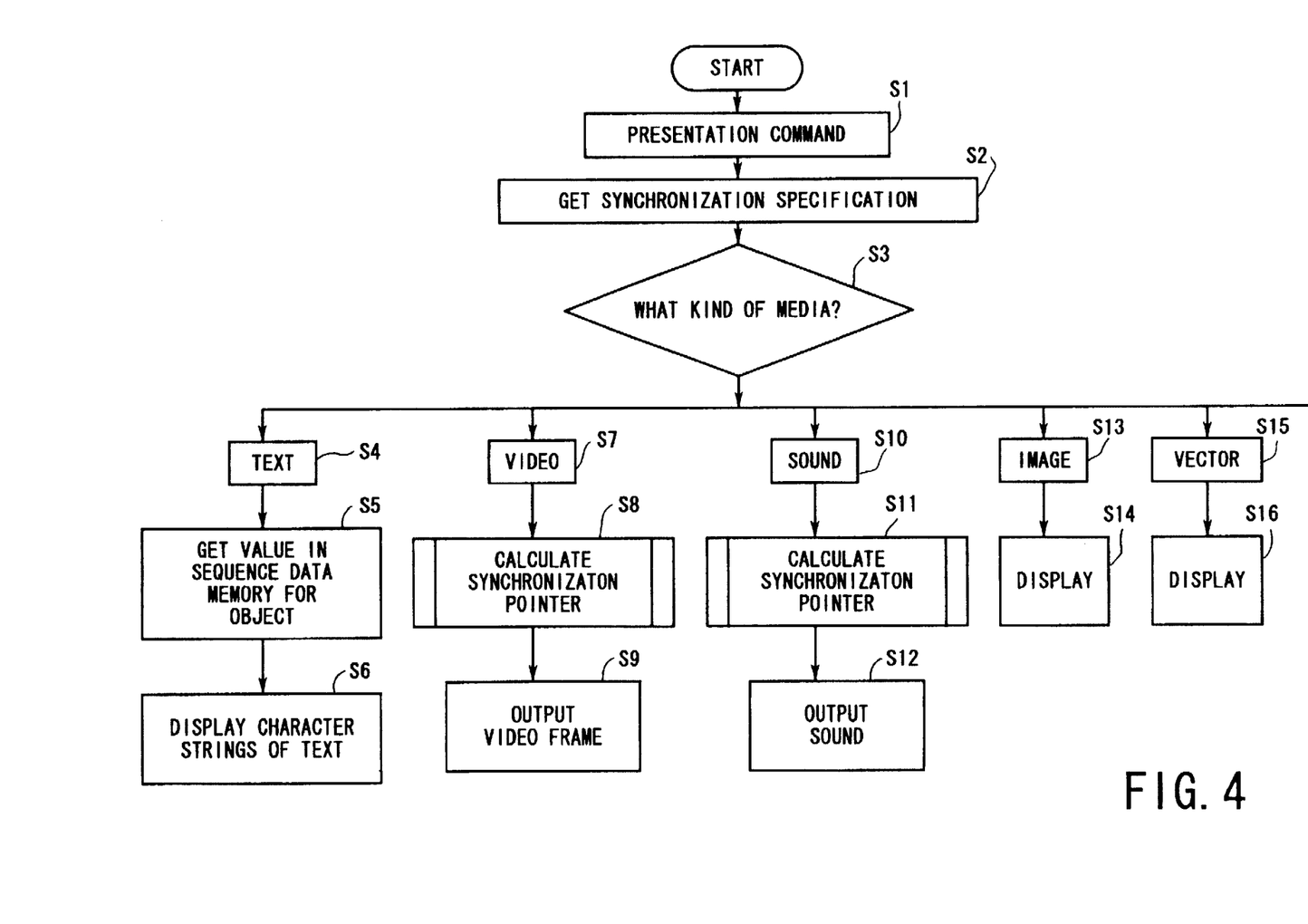
FIG. 4 is a flowchart describing a flow of calculations of synchronization control data.

FIG. 4 is a flowchart to describe a flow of calculation process for synchronization control data, showing the following 16 steps, S1 to S16.

First of all, receiving a presentation command 40 regarding a media object (Step S1), the data transition calculation means 30 refers to the synchronization condition specified in the sequence data memory for timing 21a in the control table 20 (Step S2). Media type of the object is then checked and determined (Step S3).

If the media type is text (Step S4), the data transition calculation means 30 refers to the sequence data memory for object #1 21b in the control table 20 (Step S5). The system displays a character string starting from the position in the text data which is indicated by the frame sequence count stored in the sequence data memory for object #1 21b (Step S6).

If the media type is video (Step S7), the data transition calculation means 30 calculates a sync-control variable, which indicates where in the video data the replay operation should start from, by referring to the sequence data memory for object #2 21c in the control table 20 (Step S8). The system replays the video frame according to the result of that calculation (Step S9).

If the media type is sound (Step S10), the data transition calculation means 30 calculates a sync-control variable, which indicates where in the sound data the replay operation should start from, by referring to the sequence data memory for object #3 21d in the control table 20 (Step S11). The system replays the sound according to the result of that calculation (Step S12).

If the media type is graphics image or vector (Steps S13 and S15, respectively), still media such as graphical images and figures composed of vectors are displayed as they are without transitions along the time (Steps S14 and S16, respectively).

Figure 5:
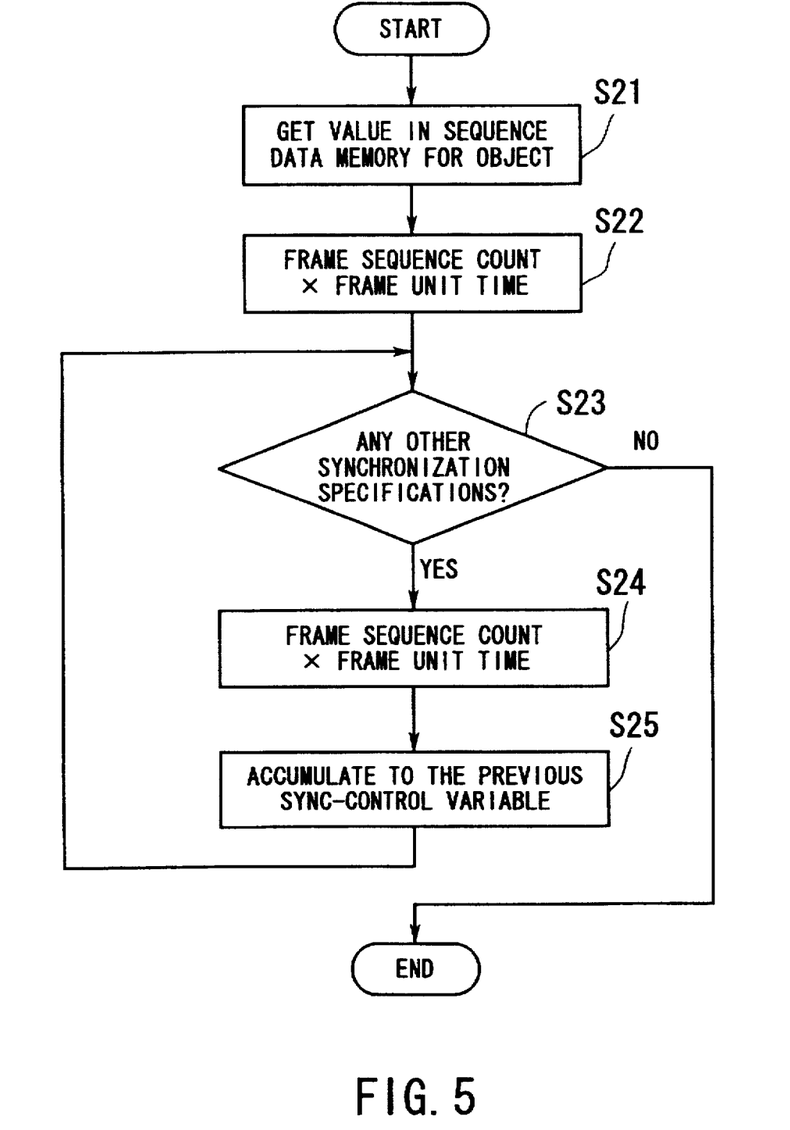
FIG. 5 is a flowchart describing how to calculate a synchronization control variable.

FIG. 5 is a flowchart describing how to calculate a sync-control variable.

In case of time-based media such as video and sound, it is necessary to obtain a point of time at which presentation of the media is started in synchronization with the transitions of frames, which has been referred to as a sync-control variable, or synchronization control data.

In order to obtain such a variable for an object, a frame sequence count stored in a sequence data memory corresponding to the object is first picked up (Step S21). Then the sync-control variable at this point of time is calculated based on the contents in the sequence data memory for timing 21a within a frame range specified by the frame sequence count which was picked up in Step S21 (Step S22). Since any change of synchronization condition within the frame range affects the sync-control variable, it should be checked whether such a change has happened or not during the presentation of the object (Step S23). If no change is observed, the sync-control variable obtained just above can be finalized. On the other hand, if any change is found, another sync-control variable based on another synchronization condition should be calculated (Step S24), and added to the previously obtained sync-control variable (Step S25). The process then returns to Step S23 and, if there is no more change in the synchronization condition, the sync-control variable obtained in Step S25 is output as a total sync-control variable. In case that there is a further condition change, the process repeats calculation of sync-control variable according to the further synchronization condition. The time elapsed so far for presentation of the media is calculated in this way as the total sync-control variable.

Figure 6:
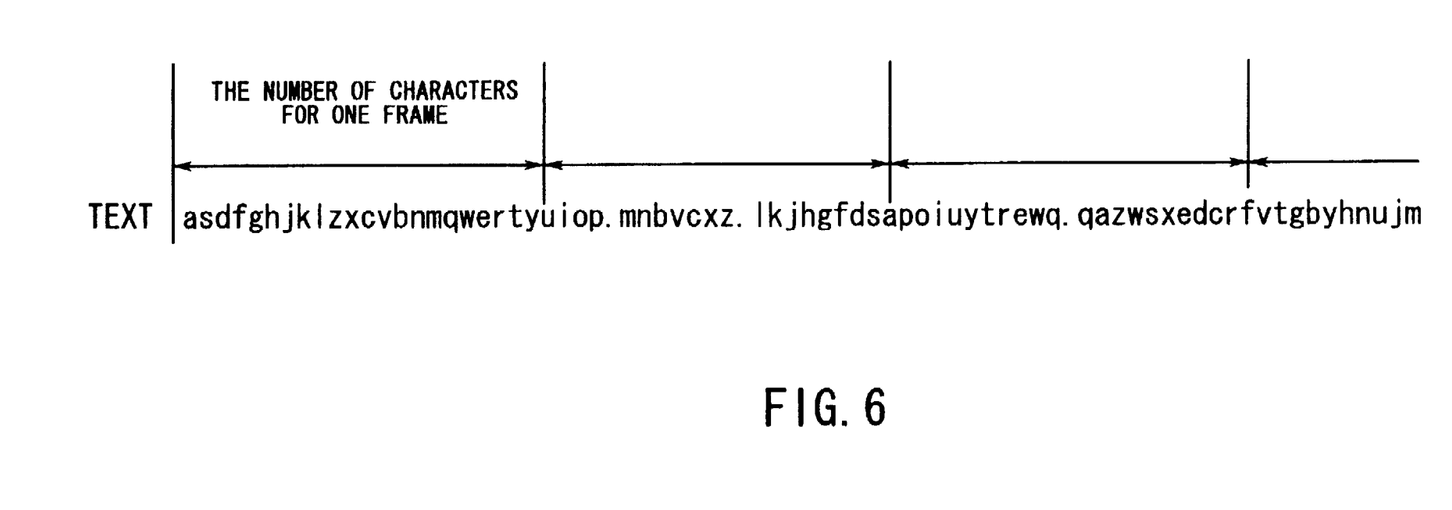
FIG. 6 shows how text data is stored in the classified media management means.

FIG. 6 shows how text data is stored in the classified media management means.

Text data is stored in the text management block 11 in the classified media management means 10 and it includes records of the text and the number of characters for each frame but no timing information. When trying to extract a text out of the text management block 11 to display it, the system refers to a value described in the sequence data memory for object #1 21b in the control table 20 shown in FIG. 3, associated with the frame number to be presented. Assuming that the frame number is #4, for example, the value associated therewith reads "3" in the sequence data memory for object #1 21b, which is a frame sequence count. The starting point of the text for presentation of frame #4 can be obtained by multiplying the number of characters per frame by that frame sequence count. A character string having the predetermined length for one frame will be extracted at the obtained starting point and provided for presentation.

Figure 7:
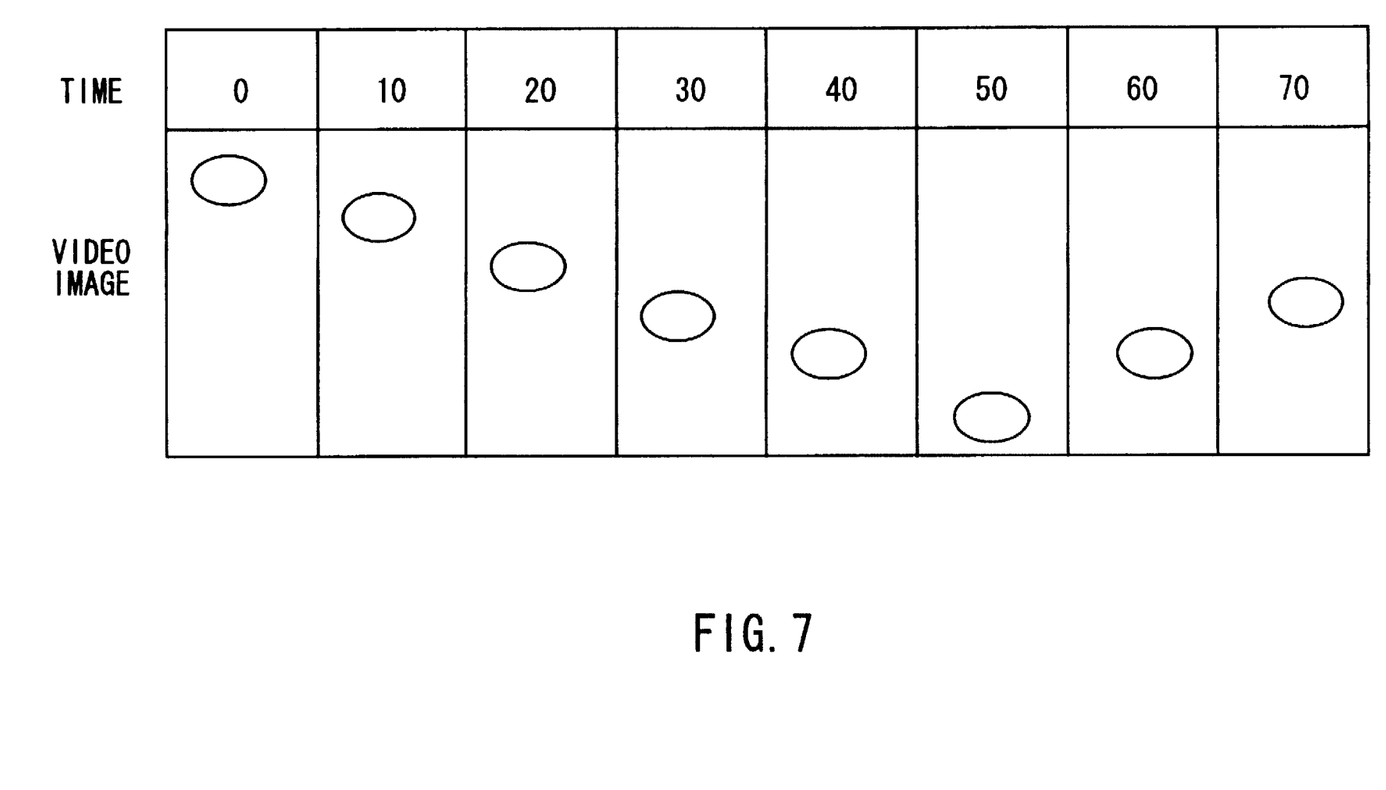
FIG. 7 shows how video data is stored in the classified media management means.

FIG. 7 shows how video data is stored in the classified media management means.

Video data is stored together with some timing information in the video management block 13 in the classified media management means 10. When taking a part of the video data out from the video management block 13 for presentation, the system will calculate a total sync-control variable according to FIG. 5 at first and then extract the data associated to that variable. Take frame #4 in the control table 20 shown in FIG. 3, for example. The calculation of sync-control variable according to FIG. 5 results in starting the video from the point of 30 time-units because $10 \times 1 + 20 \times 1 = 30$.

Figure 8:
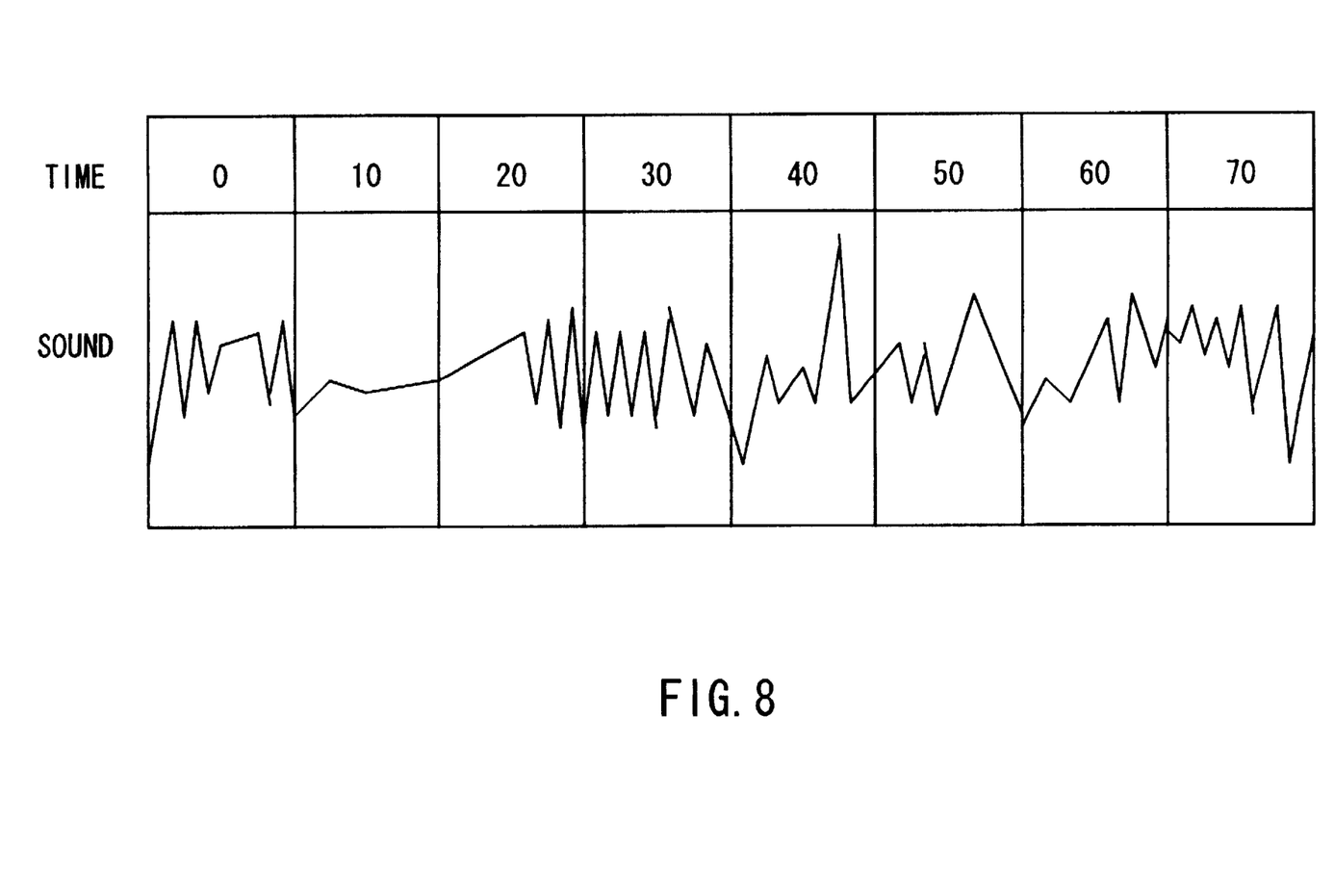
FIG. 8 shows how sound data is stored in the classified media management means.

FIG. 8 shows how the sound data is stored in the classified media management means.

In the same way as the above-described video data, sound data is also stored together with some timing information in the sound management block 14 in the classified media management means 10. When trying to replay a part of the sound data, the system will calculate a total sync-control variable according to FIG. 5 as well and then extract and replay the data associated to that variable. In the case of frame #4 in the control table 20 shown in FIG. 3, for example, the calculation of synccontrol variable according to FIG. 5 results in starting the sound from the point of zero time-units (i.e., from the very beginning) because $20 \times 0 = 0$.

As described above, synchronization control data for respective media is kept in the control table 20 in the form of intermediate synchronization control parameters consisting of frame sequence count and frame unit time. This structure allows the system to produce the total sync-control variable for final use each time of presentation of the media, and therefore, it minimizes the number of items which must be modified derivatively from a midterm change of synchronization conditions.

Figure 9:
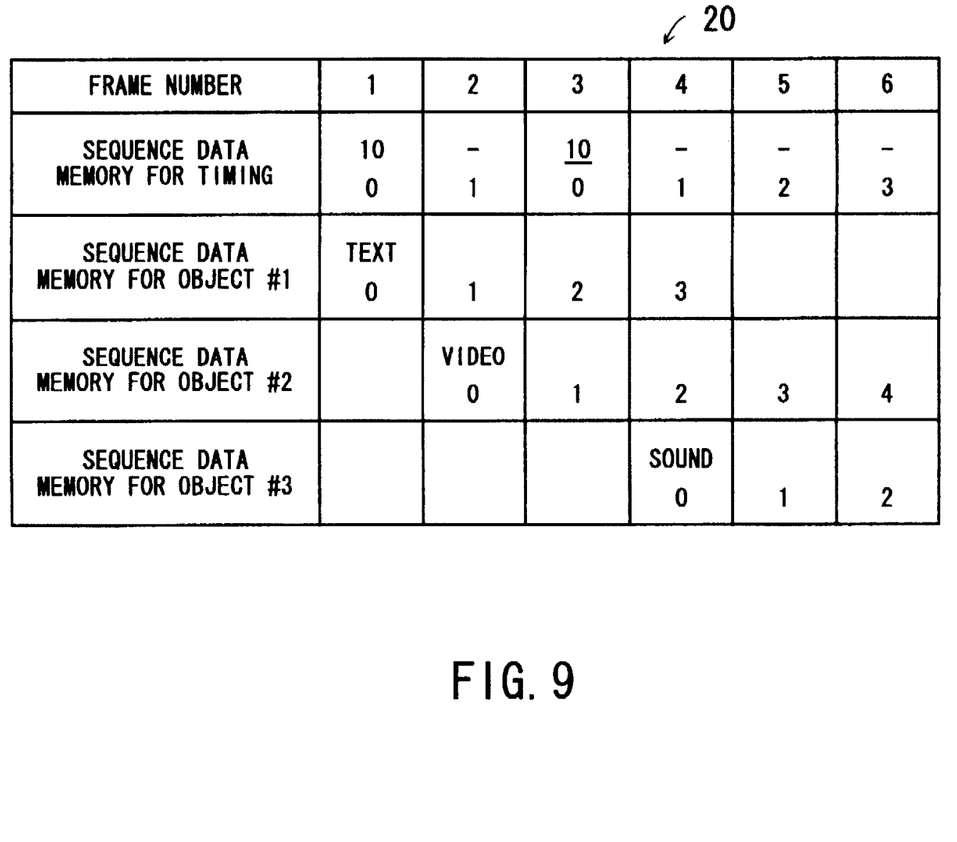
FIG. 9 illustrates a control table in case that a synchronization condition has been changed.

FIG. 9 illustrates a control table in case that a synchronization condition has been changed.

It is assumed in FIG. 9 that the frame unit time has been changed from "20" to "10" in frame #3, which formerly was "20" in FIG. 3. It is not necessary at all, in spite of that change, to modify any sequence data memory for the object and only a thing to do is to revise the sequence data memory for timing.

Occasionally, however, the frame unit time in a certain frame which is the same as those of the preceding frames may be changed to another value. Assume that the frame unit time in frame #5 of the control table 20 shown in FIG. 9 is to be changed to another value "30," for instance. Being affected by that change of the frame unit time for frame #5, the frame sequence counts for timing in frames #5 and #6 should be rewritten to "0" and "1," respectively. In case that there are further frames beyond frame #6, the frame sequence counts for timing in the succeeding frames should also be renewed with an incremental numbers to follow the count "1" in frame #6, until encountering a frame having another change of the frame unit time, where the frame sequence count is reset to FIG. 10 is a block diagram illustrating a computer hardware structure to embody the present invention.

Figure 10:
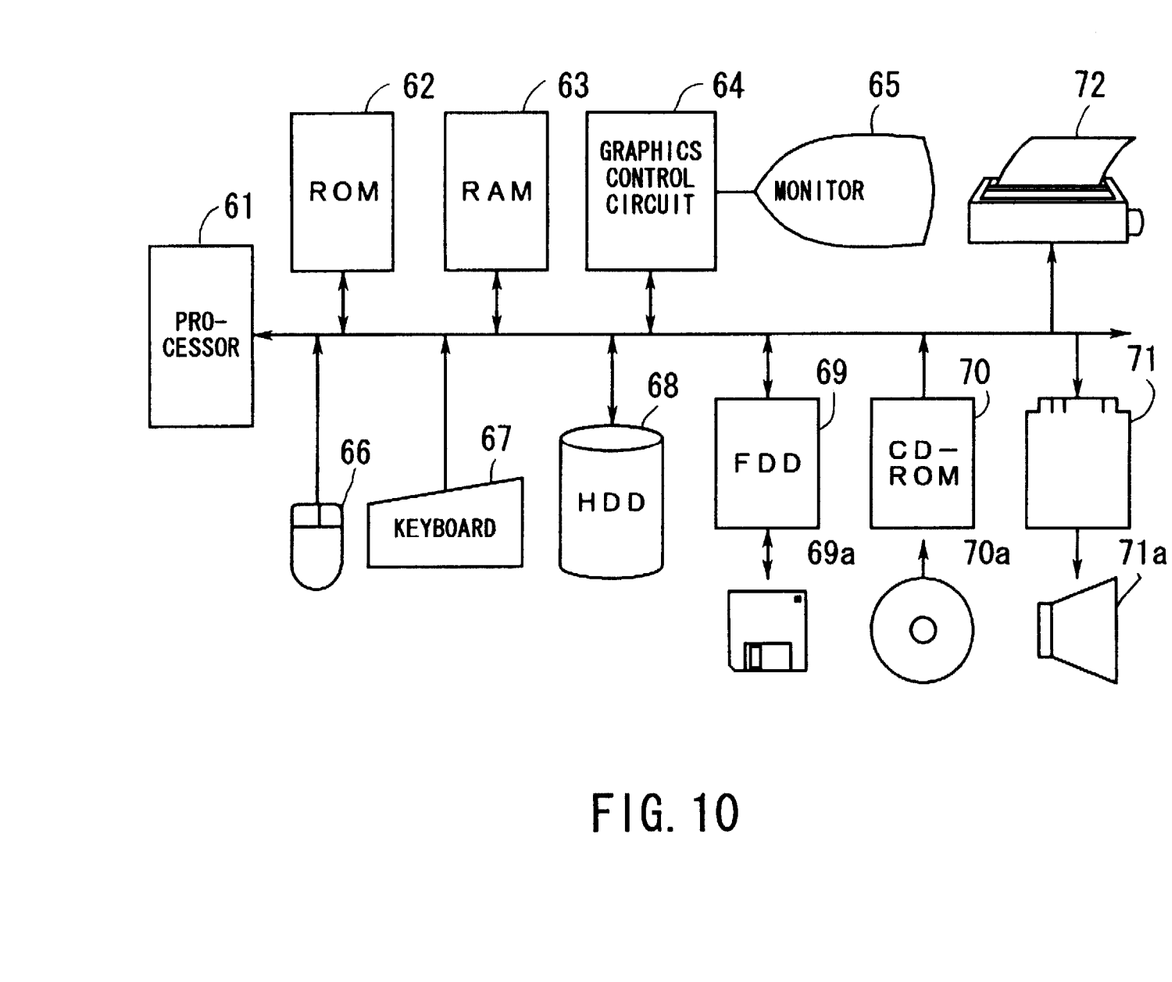
FIG. 10 is a diagram illustrating a computer hardware structure to embody the present invention.

FIG. 10 shows that the computer comprises a processor 61, a read only memory (ROM) 62, a main memory (RAM) 63, a graphics control circuit 64 with a monitor 65, a mouse 66, a keyboard 67, a hard disk drive (HDD) 68, a floppy disk drive 69, a CD-ROM drive 70, a sound board 71 with a speaker 71a, and a printer 72. Those constituents are connected to a bus 73 directly or indirectly via respective interface controllers (not shown).

The processor 61 totally supervises the computer. The read only memory (ROM) 62 contains programs necessary for power-up procedure, while the main memory (RAM) 63 is loaded with system programs, some programs of authoring software and the like as well as storing the control tables.

The graphics control circuit 64 having frame memories and the like converts data such as the control tables created in the main memory 63 and multimedia data to be expanded for presentation into a video signal to be supplied to the monitor 65. Upon reception of the video signal, the monitor 65 displays text, video, graphics image and so on.

The mouse 66 is a pointing device which is used for pointing at on-screen objects such as text or figures, or selecting one of the items in various menus, by manipulating the mouse cursor on the screen and clicking its button. The mouse 66 is specifically used to drag and select a cell range corresponding to the object which is subject to change in the control table. The keyboard 67 is used in such a case of entering names of data files which save created multi-media data.

The hard disk drive 68 stores system programs, authoring tools, CD-ROM titles or presentation programs in process of authoring, and multi-media data files.

The floppy disk drive 69 is used to import multimedia data created in other machines via the floppy disk 69a. The CD-ROM drive 70 is used for executing CD-ROM titles or presentation programs recorded in the CD-ROM 70a, and the sound board 71 and speaker 71a replay the sound data. Image data in created titles can be printed out by the printer 72.

To summarize the above description, according to the present invention, the synchronization control data required for synchronizing the media elements with each other is stored in a preparatory form as intermediate synchronization control parameters, and the synchronization control data for final use is calculated during the real-time execution according to the intermediate synchronization control parameters. This structural arrangement, therefore, minimizes the amount of data which should be modified derivatively from a change of synchronization conditions which possibly occurs. For example, when an operator specifies a change in synchronization condition by selecting a targeted range of cells in a control table, data affected by the change are limited only within that range or at most the range including its following cells. This results in a flexible and real-time adaptation to such a change of time-based transitions of media data.

In addition, the present invention enables modification of frame-to-frame transitions of media data on a real-time basis. The system can accept new versions, which may involve different synchronization conditions, without requiring any additional effort to adapt itself for them. Further, the system provides a unified operating environment to change various multi-media data transitions.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A multimedia dynamic synchronization system which represents a plurality of multimedia data objects in synchronization with transition of time, location and frame number, the system comprising:

classified media management means for storing a plurality of data being classified by the types of the media, which data are specific to respective types of media;

sequence data memory means for separately storing in control table form a frame sequence count that represents a sequential data length in a count of frames after starting of a data presentation, and a frame unit time that represents a unit time length for one frame during which the data presentation is continuously performed; and data transition calculation means for dynamically calculating a sequence length indicative of a data length measured from a starting time of the data presentation each time a presentation of the media is performed, the sequence length being obtained by calculating a product of the frame sequence count and the frame unit time stored in said sequence data memory means.

2. A multimedia dynamic synchronization system according to claim 1, wherein said sequence data storage means is provided for each of the multimedia data objects.

3. A multimedia dynamic synchronization system according to claim 1, wherein said data transition calculation means accumulates the sequence lengths calculated, each time a transition of the frame unit time occurs after the data presentation has started.

4. A method of representing a plurality of multimedia data objects in synchronization, comprising the steps of:

storing a plurality of data which are specific to respective media types while being respectively classified by the media types;

storing a frame sequence count that represents a sequential data length in a count of frames after starting of a data presentation;

storing a frame unit time that represents a unit time length for one frame during the data presentation separate from the stored frame sequence count; and calculating synchronization control data for each respective media type in reference to information common to the frame sequence count and the frame unit time each time a presentation of the media is performed.

* * * * *